United States Patent
Ren

(10) Patent No.: US 12,251,839 B2
(45) Date of Patent: Mar. 18, 2025

(54) DEXTEROUS HAND CONTROL SYSTEM BASED ON MULTI-SENSOR AND ANTAGONISTIC DRIVE

(71) Applicant: NEUROCEAN TECHNOLOGIES INC., Guangdong (CN)

(72) Inventor: Hualong Ren, Guangdong (CN)

(73) Assignee: NEUROCEAN TECHNOLOGIES INC., Guangdong (CN)

( * ) Notice: Subject to any disclaimer, the term of this patent is extended or adjusted under 35 U.S.C. 154(b) by 334 days.

(21) Appl. No.: 17/831,091

(22) Filed: Jun. 2, 2022

(65) Prior Publication Data
US 2022/0288775 A1    Sep. 15, 2022

Related U.S. Application Data

(63) Continuation of application No. PCT/CN2020/133437, filed on Dec. 2, 2020.

(30) Foreign Application Priority Data

Dec. 2, 2019  (CN) .......................... 201911213420.7

(51) Int. Cl.
  *B25J 9/16*   (2006.01)
  *B25J 9/10*   (2006.01)
  *B25J 13/08*  (2006.01)

(52) U.S. Cl.
  CPC .......... *B25J 9/1633* (2013.01); *B25J 9/1045* (2013.01); *B25J 13/085* (2013.01)

(58) Field of Classification Search
  CPC ...... B25J 9/1633; B25J 9/1045; B25J 13/085; B25J 15/0009; B25J 13/08; B25J 13/00; B25J 13/084; B25J 13/087
  See application file for complete search history.

(56) References Cited

U.S. PATENT DOCUMENTS

| 8,483,880  B2   | 7/2013 | De La Rosa Tames et al. |
| 10,286,561 B2 * | 5/2019 | Miyazaki ................. B25J 9/142 |

(Continued)

FOREIGN PATENT DOCUMENTS

| CN | 103426351 A | 12/2013 |
| CN | 104191429 A | 12/2014 |

(Continued)

OTHER PUBLICATIONS

A robot hand with elastic fingers and it's application to assembly process (Year: 1977).*

(Continued)

*Primary Examiner* — Kyle T Johnson
(74) *Attorney, Agent, or Firm* — CANTOR COLBURN LLP

(57) ABSTRACT

A dexterous hand control system based on multi-sensor and antagonistic drive is provided. The system includes a dexterous hand driven by antagonistic tendon transmission, joint angle sensors, bionic skin tactile sensors, joint force and torque sensors, tendon tension sensors, a sensor management module, an actuator control module; and a central control module. The system effectively decouples different levels of force and tactile perception, and can flexibly and comprehensively analyze various sensory information under different operational tasks, simplifying the control difficulty and reducing the design complexity and cost of various types of sensors. The central control module of the system can control the dexterous hand to avoid excessive tendon relaxation or tension, and can well balance compliant operation and anti-interference robustness, and make the system remain reliable when the joint force and torque sensors or tendon tension sensors are partially or completely missing or malfunctioning.

14 Claims, 3 Drawing Sheets

(56) References Cited

U.S. PATENT DOCUMENTS

| | | | | |
|---|---|---|---|---|
| 10,321,900 | B2* | 6/2019 | Au | A61B 34/30 |
| 2010/0152898 | A1* | 6/2010 | Reiland | B25J 9/1633 |
| | | | | 700/261 |
| 2011/0071664 | A1* | 3/2011 | Linn | B25J 9/0006 |
| | | | | 294/25 |
| 2015/0019013 | A1* | 1/2015 | Rose | B25J 13/08 |
| | | | | 702/41 |
| 2017/0129110 | A1* | 5/2017 | Ohm | B25J 13/084 |
| 2017/0340396 | A1* | 11/2017 | Romo | B25J 9/1682 |
| 2019/0099899 | A1* | 4/2019 | Miyazaki | B25J 13/082 |
| 2019/0105785 | A1* | 4/2019 | Meyer | A61B 34/30 |
| 2019/0160692 | A1* | 5/2019 | Miyazaki | B25J 15/0009 |
| 2020/0156260 | A1* | 5/2020 | Takasaki | B25J 9/142 |
| 2021/0394360 | A1* | 12/2021 | Hwang | B25J 9/1612 |
| 2022/0287853 | A1* | 9/2022 | Ren | B25J 13/088 |
| 2022/0288775 | A1* | 9/2022 | Ren | B25J 13/08 |

FOREIGN PATENT DOCUMENTS

| | | | |
|---|---|---|---|
| CN | 104755041 | A | 7/2015 |
| CN | 105690388 | A * | 6/2016 |
| CN | 109591041 | A | 4/2019 |
| CN | 110842952 | A | 2/2020 |

OTHER PUBLICATIONS

The Utah MIT Dextrous Hand (Year: 1984).*
Stable Prehension with a MultiFingered hand (Year: 1985).*
The smartHand Transradial Prosthesis (Year: 2011).*
CN-105690388-A translation (Year: 2016).*
Handbook of Robotics Second Edition (Year: 2016).*
Bionic_Design_of_a_Dexterous_Anthropomorphic_Hand_Actuated_by_Antagonistic_PAMs.pdf (Year: 2020).*
Hand_synergies_Integration_of_robotics_and_neuroscience_for_understanding_the_control.pdf (Year: 2016).*
International Search Report for International Application No. PCT/CN2020/133437; Date of Completion: Feb. 4, 2021; Date of Mailing: Feb. 26, 2021; 5 Pages.
Translation of International Search Report for International Application No. PCT/CN2020/133437; Date of Completion: Feb. 4, 2021; Date of Mailing: Feb. 26, 2021; 3 Pages.
Translation of Written Opinion for International Application No. PCT/CN2020/133437; Date of Completion: Feb. 4, 2021; Date of Mailing: Feb. 26, 2021; 5 Pages.
Written Opinion for International Application No. PCT/CN2020/133437; Date of Completion: Feb. 4, 2021; Date of Mailing: Feb. 26, 2021; 4 Pages.

* cited by examiner

US 12,251,839 B2

DEXTEROUS HAND CONTROL SYSTEM BASED ON MULTI-SENSOR AND ANTAGONISTIC DRIVE

CROSS-REFERENCE TO RELATED APPLICATION

This application is a continuation application of PCT International application No. PCT/CN2020/133437 filed on Dec. 2, 2020, which claims priority to and benefits of Chinese patent application No. 201911213420.7, filed on Dec. 2, 2019, the entire contents of which are incorporated herein by reference for all purposes. No new matter has been introduced.

BACKGROUND

Technical Field

This application belongs to the control field of robot dexterous hands, and specifically relates to a dexterous hand control system based on multi-sensor and antagonistic drive.

Description of Related Art

Bionic dexterous hand refers to a manipulator whose number of fingers, degrees of freedom, shape, and functions are close to those of a human hand. The bionic dexterous hand can manipulate objects with dexterity and precision. It is suitable as the high-performance prosthesis or used in compliant assembly and other industrial scenarios. It can also replace personnel to work in hazardous environments such as pollution, poisoning and radiation, and can be applied to service robots with strong versatility. Bionic dexterous hands are key components of bionic or humanoid robots.

Tendon transmission is now widely used in many dexterous hand systems. Tendon transmission is used to transfer the motion and power of the actuator located in the forearm to the narrow hand space through the tendon (which is made of steel wire or flexible rope), and drives the rotation of relevant joints. Tendon transmission solves the contradiction that it is difficult to install high-power and high-torque (or high-pulling force) actuator in the narrow hand space. The tendon transmission systems of existing dexterous hands mostly adopt a scheme in which each joint is driven by a rotational actuator. The output shaft of the actuator is fixedly connected to a capstan, and the tendon is wound around the capstan, extending to the movable pulley of the joint and winding back to the capstan to form a closed loop. As the actuator rotates, the capstan pulls its wound tendons in on one side and out on the other, causing the joint to rotate. However, there are gaps in the transmission path of the tendons, which are easily affected by other joints. In this way, it is difficult to ensure that the contraction and release length of the tendons on both sides are always consistent, resulting in the relaxation or excessive tension of the tendons on both sides sometimes, which is not reliable enough. At the same time, loose tendons can also cause control problems.

SUMMARY

One purposes of this application is to provide a dexterous hand control system based on multi-sensor and antagonistic drive, aiming to solve the problems that the existing dexterous hands is difficult in analyzing and controlling various sensory information under different operating tasks, and the design of various types of sensors is complex and the cost is high.

In order to solve the above technical problems, the present application proposes a dexterous hand control system based on multi-sensor and antagonistic drive. The dexterous hand control system comprises: a dexterous hand driven by an antagonistic tendon transmission; a sensor module; a sensor management module; an actuator control module; and a central control module.

Human joints are driven antagonistically by a pair of muscle groups. When one muscle contracts and the other releases, the joint moves in one direction, and vice versa. The coordination of the pair of muscles can flexibly control the joint damping and stiffness of human joints, so that human limbs can output flexible movement and force, which can not only adapt to the contact of objects and operations, but also maintain high anti-interference robustness. The dexterous hand with tendon transmission can also simulate this method, with each joint driven antagonistically by a pair of actuators, that is, when the joint needs to rotate in one direction, one actuator pulls on one side of the tendon, the other drives on the other side, and vice versa. The coordination of the two actuators can flexibly control the tensioning degree of tendons on both sides, avoiding tendon relaxation or excessive tension and improving system reliability. This driving method can also control joint damping and joint stiffness, so as to give consideration to compliant operation and anti-interference robustness.

In addition to position feedback, some dexterous hand systems incorporate force feedback. Some dexterous hands in the fingertip (i.e., distal phalange are installed with fingertip force sensors, which are used to measure force or torque incurred by dexterous fingers to contacted objects and the contacting points. Other dexterous hands have an array of pressure sensors attached to the surface of their hands to simulate bionic skin. These solutions often require sensors that can both sense the contact points and accurately measure the contacting force, making the design and production of sensors complicated and costly to use.

Human hand skin has a rich sense of touch, and can sense the contact with the object through each contact point, as well as the shape, texture and stiffness of the object, but cannot accurately measure the magnitude of the contact force. There are sensory receptors and nerves in the joints of the hand, which can accurately perceive the interaction force between each phalange and joint incurred by contacting objects, especially advantageous for fine operation and with the touch of the skin to further perceive the shape, texture and stiffness of the object. Human tendons have receptors and nerves that can sense tendon tension, which can be used to evaluate the force exerted by each finger or hand on the object as a whole, especially for estimating the force when pulling and lifting heavy objects. These structures and characteristics of the human hand effectively decouple the sensory processes of different levels of force and touch, bringing convenience to the comprehensive analysis of the nervous system. Dexterous hand can also draw lessons from this way, use a variety of different sensors to perceive different levels of force and tactile information, reduce the coupling between different levels of perceptual information, facilitate under different operating tasks in a variety of sensory information for flexible comprehensive analysis and simplify the difficulty of control, and reduce the design complexity of the various types of sensors and cost.

The dexterous hand driven by an antagonistic tendon transmission is configured as a dexterous hand having one or more joints driven by tendon and antagonistic action.

The sensor module comprises a joint angle sensor set composed of multiple joint angle sensors, a tactile sensor set composed of multiple tactile sensors in bionic skin, a joint force and torque sensor set composed of multiple joint force and torque sensors, and a tendon tension sensor set composed of multiple tendon tension sensors.

The joint angle sensors are arranged at each joint of the dexterous hand, and are configured to measure rotation angle of each joint, the output signal of the joint angle sensors is configured to be processed by the sensor management module to obtain joint position information.

The tactile sensors are distributed in the bionic skin, and are configured to sense contact with an object, the output signal of the tactile sensors is configured to be processed by the sensor management module to obtain tactile information.

The joint force and torque sensors are arranged at each interphalangeal joint, metacarpophalangeal joint, carpometacarpal joint, and wrist joint of the dexterous hand, and are configured to measure one to multi-dimensional force or torque or torque at the joint, and the output signal of the joint force and torque sensors is configured to be processed by the sensor management module to obtain joint force and torque information.

The tendon tension sensors are arranged within the tendon, and are configured to measure tension of the tendon, and the output signal of the tendon tension sensors are configured to be processed by the sensor management module to obtain tendon tension information.

The sensor management module is configured to apply constant power or periodic scanning power to each joint angle sensor, each tactile sensor, each joint force and torque sensor, and each tendon tension sensor in the sensor module, and the output signal of the sensors in the sensor module is configured to be amplified, filtered, sampled and converted by the sensor management module, and the sensor management module is configured to monitor for missing sensors or abnormal conditions, and to pass processed output signals and monitoring results to the central control module.

In one possible implementation of this application, the sensor management module is configured to receive control instructions from the central control module and to adjust the working mode according to the control instructions.

The actuator control module comprises a current loop, a voltage loop and a speed loop that control each actuator, and is configured to automatically protect voltage or current of the actuator from overload, and to monitor whether each actuator is missing or working abnormally, and to transmit the current, the voltage, speed and monitoring results to the central control module.

The actuator control module is configured to read joint angle information through the sensor management module to form a joint limit direct control loop.

The actuator control module is configured to read joint force and torque information through the sensor management module to form a joint force and torque protection direct control loop.

The actuator control module is configured to read the tendon tension information through the sensor management module to form a tendon tension protection direct control loop.

In one possible implementation of this application, the actuator control module is configured to receive the control instructions from the central control module and to adjust control mode of each actuator according to the control instructions, that is, to separately select the current loop, the voltage loop, the speed loop or any combination of the current loop, the voltage loop and the speed loop to control each actuator.

The central control module is configured to receive operation targets, and to control the sensor management module and read each sensor's information, to obtain control signal through multi-sensor information synthesis and control strategy calculation process, and to transmit the control signal to the actuator control module to control each actuator so as to further control joint position, joint speed, joint force and torque, joint damping, joint stiffness, tendon tension and the contact with the object of the dexterous hand.

In one possible implementation of this application, the central control module employs a digital computer or an analog computer or FPGA or ASIC or a brain-inspired neural network chip or combination thereof as computation platform.

In one possible implementation of this application, the central control module is configured for hybrid computation using a deep learning neural network, a pulsed neural network and rule-based program.

In one possible implementation of this application, the central control module is equipped with a sensor sampling and analyzing strategy, a control strategy to prevent tendon relaxation, a control strategy to prevent tendon over-tightness, a controllable load-based control strategy, a dynamic model-based control strategy, and a neural network-based control strategy.

The controllable load-based control strategy comprises classifying the actuators that constitute an antagonistic drive to the controlled joint into active actuators and driven actuators; and adjusting the voltage and/or current of the driven actuator to make the driven actuator to be in follow motion mode and to be dragged by the joint through the tendon so as to be equivalent to the controllable load, forming open loop or closed loop control.

The dynamic model-based control strategy comprises establishing dynamic models of the one or more actuators that each constitutes the antagonistic drive, transmission mechanisms, the joints and/or external loading; and estimating one or more state variables through the dynamic model, forming open loop or closed loop control.

The neural network-based control strategy comprises using neural network as controller and inputting information of one or more sensors or the one or more state variables to the neural network; and taking the neural network's output as control input of the one or more actuators.

The state variables include voltage, current, inertia, damping of one or more actuators, as well as joint position, joint velocity, joint force and torque, joint damping, joint stiffness, tendon tension, load and their function relation with time.

In one possible implementation of this application, the central control module is configured to assign for a specific joint, by configuration, the controllable load-based control strategy or the dynamic model-based control strategy or the neural network-based control strategy.

In one possible implementation of this application, when the dexterous hand is not equipped with the joint force and torque sensors or the tendon tension sensors, the central control module is configured to adopt the dynamic model-based control strategy or the controllable load-based control strategy by default.

In one possible implementation of this application, when the dexterous hand is arranged with the joint force and torque sensors and the tendon tension sensors, the central control module is configured to adopt the neural network-based control strategy by default, and when the joint force and torque sensors or the tendon tension sensor are partially or completely missing or working abnormally, the central control module is configured to automatically switch to the dynamic model-based control strategy or the controllable load-based control strategy to ensure system reliability.

The sensor sampling and analyzing strategy includes one or more of:
1) when there is a need to sense the contact with the object or to sense the shape and texture of the object without the need for accurate measurement of contact force, preferentially sampling the tactile sensors in the bionic skin; increasing sampling frequency of the tactile sensors; and amplifying the weight of the tactile information relative to the sensor information during the calculation process of the multi-sensor information synthesis and control strategy;
2) when there is a need for fine manipulation and when interaction force and torque of hand phalanges and joints when in contact with the objects need to be accurately sensed, prioritizing the sampling of the joint force and torque sensors; increasing the sampling frequency of the joint force and torque sensors; amplifying the weight of the joint force and torque information relative to other sensory information during the calculation process of the multi-sensor information synthesis and control strategy; and at the same time, further perceiving the contact between the hand and the object, as well as the shape and texture of the object is achievable by combining the tactile information in the bionic skin;
3) when pulling, lifting heavy objects or doing other actions that require a pre-set force, prioritizing the sampling of the tendon tension sensors; increasing the sampling frequency of the tendon tension sensors to evaluate the force exerted by each finger or the whole hand on the object; amplifying the weight of the tendon tension information relative to other sensory information during the calculation process of the multi-sensor information synthesis and control strategy; and at the same time, further accurate measurement of the joint force or torque is achievable by combining the joint force and torque sensors-related information;
4) when some or all of the tactile sensors of the bionic skin are missing or malfunctioning, prioritize the sampling of the joint force and torque sensors; and amplifying the weight of the joint force and torque information relative to the other sensory information during the calculation process of the multi-sensor information synthesis and control strategy; and
5) when some or all of the joint force and torque sensors are missing or malfunctioning, prioritize the sampling of the tendon tension sensors; and amplifying the weight of the tendon tension information relative to the other sensory information during the calculation process of the multi-sensor information synthesis and control strategy.

The sensor management module is configured to automatically adjust the frequency of power applied to each sensor and the sampling frequency of the output signal of said each sensor based on an adjustment method. The adjustment method comprises:
1) when output signal amplitude of a certain sensor is continuously lower than a sensitivity threshold within a certain time range, or change rate of the output signal amplitude with time is continuously lower than a change rate threshold within a certain time range, adjusting the frequency of power applied to the sensor and the sampling frequency of the output signal to a first pre-set frequency range, for example from 0.1 Hz to 10 Hz; and
2) when the amplitude of the output signal of any one of the sensors is higher than the sensitivity threshold, or the change rate of the output signal amplitude with time is higher than the change rate threshold, adjusting the frequency of power applied to the sensor and the sampling frequency of the output signal to a second pre-set frequency range, for example from 10 Hz to 1000 Hz.

When the sensor management module receives the control instructions from the central control module, the sensor management module's working mode comprises one or more of:
1) applying power to the sensor specified by the control instructions at a specified frequency;
2) monitoring the sensor specified by the control instructions;
3) amplifying the output signal of the specified sensor by multiplication factor specified by the control instructions;
4) filtering the output signal of the specified sensor by a filtering method specified by the control instructions;
5) prioritizing the sampling and converting the output signal of the sensor specified by the control instructions; and
6) sampling and converting the output signal of the specified sensor with the sampling frequency specified by the control instruction.

When the system is abnormal so that the joint exceeds an allowable range of motion, the joint limit direct control loop is configured to respond quickly and to control the actuators to limit the joint to the allowable range of motion. The central control module has a control instruction that intervenes the joint limit direct control loop, and is configured to actively prevent the joint limit direct control loop from working.

When the system is abnormal so that the joint force and torque exceeds an allowable range of motion, the joint force and torque protection direct control loop is configured to respond quickly and to control the actuators to limit the joint force and torque to the allowable range of motion. The central control module has a control instruction that intervenes the joint force and torque protection direct control loop, and is configured to actively prevent the joint force and torque protection direct control loop from working.

When the system is abnormal so that the tendon tension exceeds an allowable range of motion, the tendon tension protection direct control loop is configured to respond quickly and to control the actuators to limit the tendon tension to the allowable range of motion. The central control module has a control instruction that intervenes the tendon tension protection direct control loop, and is configured to actively prevent the tendon tension protection direct control loop from working.

The joint limit direct control loop, joint force and torque protection direct control loop and tendon tension protection direct control loop make the control system more reliable.

The control strategy for preventing the tendon relaxation comprises:
1) setting the minimum threshold of the tendon tension;
2) determining if the tendon tension is below the minimum threshold through the tendon tension sensor; and 3) if the tendon tension is below the minimum threshold, allowing the actuators that are pulling the tendon to further tighten the tendon until the tendon tension is equal to or slightly above the minimum threshold, and The control strategy to prevent tendon over-tightness comprises:
1) setting the highest threshold of tendon tension;
2) determining if the tendon tension is higher than the highest threshold by the tendon tension sensor; and
3) if the tendon tension is above the maximum threshold, allowing the actuators that are pulling the tendon to further release the tendon until the tendon tension is equal to or slightly below the maximum threshold.

The controllable load-based control strategy comprises:
1) classifying the actuators that each constitutes an antagonistic drive to the controlled joint into active actuators and driven actuators;
2) adjusting the voltage or current of the driven actuator to make the driven actuator to be in the follow motion mode and to be dragged by the joint through the tendon so as to be equivalent to the controllable load with inertia and controllable damping;
3) according to the joint speed and the required amount of damping incurred by the controllable load, calculating the voltage or current to be applied to the driven actuator through the model of the actuator;
4) taking the motion process of the active actuators dragging the joint through the tendon so as to drag the controllable load as controlled object. The controlled object is equivalent to the joint motion control process of the robot joint driven by a single actuator, so the control problem is effectively simplified; and
5) using a first set, which consists of the joint position, the joint speed, the joint force and torque, the joint damping, the joint stiffness, the tendon tension, and the contact with the object, or the first set's subset as expected values, and using a second, which consists of the joint position information, the joint speed information, the joint force and torque information, the tendon tension information, and the tactile information, or the second set's subset as feedback values, forming open-loop or closed-loop control.

The dynamic model-based control strategy comprises:
1) establishing dynamic models of the one or more actuators that each constitutes the antagonistic drive, the transmission, the joints and/or the external load. The dynamic models comprises a functional relationship among time, the voltage or current of each actuator that constitutes the antagonistic drive, the joint position, the joint speed, the joint force and torque, the joint damping, the joint stiffness, and the tendon tension. In the absence of the joint force and torque sensors or the tendon tension sensors, the joint force and torque, the joint damping, the joint stiffness, and the tendon tension can be estimated through the dynamic models;
2) when an open-loop control is performed on a first set consisting of the joint force and torque, the joint damping, the joint stiffness, the tendon tension, or on a subset thereof as target values, using the target values and the joint position information as dependent variables of the dynamic model to obtain the voltage or current that should be applied to each actuator that constitutes the antagonistic drive;
3) when the closed-loop control is performed on a second set consisting of the joint force and torque, the joint damping, the joint stiffness, the tendon tension, or on a subset thereof as the target values, taking the joint position information and respective voltage or current of each actuator that constitutes the antagonistic drive as the input of the dynamic models; taking the output of the dynamic models as estimated values of the joint force and torque, the joint damping, the joint stiffness, the tendon tension; using the estimated value corresponding to the expected values as the feedback values; making the difference between the feedback values and the expected values to get the deviation values; and inputting the deviation values to a control unit;
4) when the closed-loop control is performed on the target joint position and the target joint speed as the expected values, using the joint position information and the joint speed information as the feedback values; using the difference between the feedback values and the expected values to obtain the deviation values; and inputting the deviation values to the control unit; and
5) further calculating through control unit the voltage or current that should be applied to each actuator that constitutes the antagonistic drive.

In one possible implementation of this application, the control unit is configured with a PID control or a neural network-based control.

The neural network-based control strategy comprises:
1) building a multilayer neural network as a motion controller;
2) inputting a first set or a subset thereof consisting of the joint positions, the joint speeds, the joint forces and torques, the joint damping, the joint stiffness of one or more joints of the dexterous hand, the tendon tension, and the contact with the object as expected values to the multilayer neural network;
3) inputting a second set or a subset thereof consisting of the joint position information, the joint speed information, the joint force and torque information of one or more joints of the dexterous hand, the tendon tension information, and the tactile information to the multilayer neural network; and
4) taking output calculated by the multilayer neural network as the voltage or current that should be applied to each actuator.

The beneficial effects of this application are as follows: the tactile sensor in the bionic skin used in the dexterous hand control system based on multi-sensor and antagonistic drive provided in this application example only needs to be able to perceive the contact point without accurately measuring the contact force. The joint force and torque sensors only need to be able to sense forces or torques acting on joints, and tendon tension sensors only need to be able to make coarse-grained estimates of tendon tension, thus reducing the overall design complexity and cost of all types of sensors (and of the tactile bionic skin). The system adopts the combination of various sensors and the sensor sampling and analyzing strategy of the central control module, which effectively decouples the perception of force and touch at different levels, facilitating flexible comprehensive analysis of various sensory information under different operational tasks and simplifying the difficulty of control. The sensor management module can also apply power to each sensor in the way of periodic scanning so as to reduce the power consumption and heat of each sensor, and prolong the service life of the sensors. The central control module of the system supports the control strategy of preventing tendon relaxation, the control strategy of preventing tendon over-tightness, the controllable load-based control strategy, the dynamic model-based control strategy, and the neural network-based control strategy. The above strategies can effectively avoid excessive tendon relaxation or over-tightness, and can control the joint damping and stiffness of each joint of the dexterous hand, so that the dexterous hand can balance the compliant operation and anti-interference robustness. The central control module can also switch to the controllable load-based control strategy or the dynamic model-based control strategy when the joint force and torque sensor or tendon tension sensor is partially or completely missing or working abnormally, so that the system can still work reliably.

BRIEF DESCRIPTION OF THE DRAWINGS

In order to describe the embodiments of the present disclosure more clearly, a brief introduction regarding the accompanying drawings that need to be used for describing the embodiments of the present disclosure or demonstrated technology is given below. It is apparent that the accompanying drawings described below are only some embodiments of the present disclosure, the person of ordinary skill in the art may also obtain other drawings according to the these drawings without paying creative effort.

DETAILED DESCRIPTION

In order to make the purpose, technical scheme and advantages of this application more clear, the application is explained in detail in combination with the drawings and embodiments. It should be understood that embodiments described herein are intended only to interpret and not to limit this application.

In order to explain the technical scheme of this application, the following details are given in combination with the drawings and embodiments.

Figure 1:
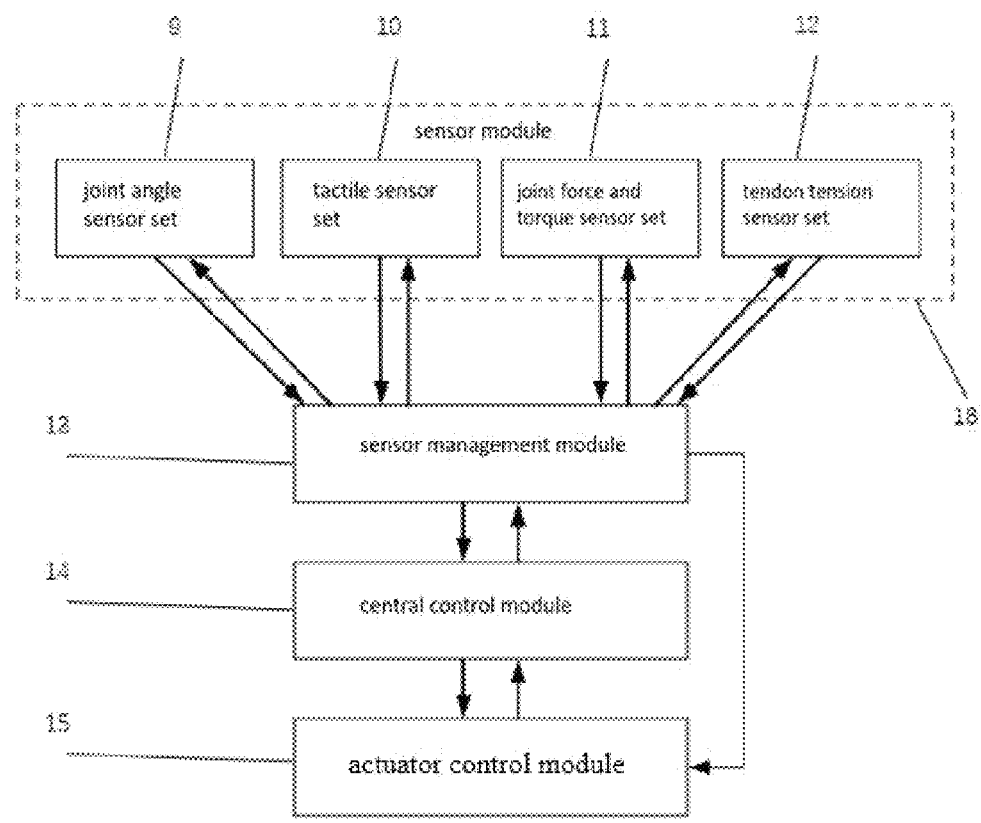
FIG. 1 is a system block diagram of a dexterous hand control system based on multiple sensors and antagonistic drive provided in this application.

As shown in FIG. 1, the present application proposes a dexterous hand control system based on multi-sensor and antagonistic drive. The dexterous hand control system comprises: a dexterous hand driven by an antagonistic tendon transmission; a sensor module 18; a sensor management module 13; an actuator control module 15; and a central control module 14.

The dexterous hand driven by an antagonistic tendon transmission is configured as a dexterous hand having one or more joints driven by tendon and antagonistic action.

Figure 2:
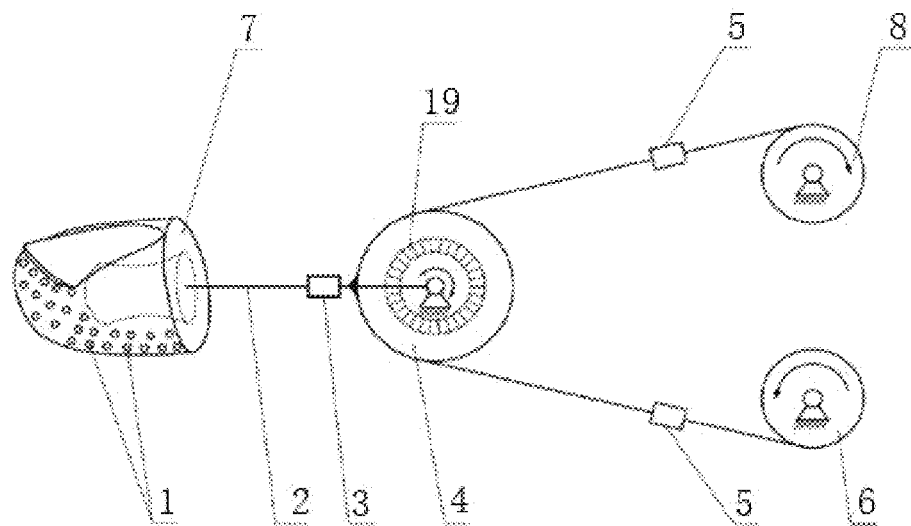
FIG. 2 is a schematic diagram of a dexterous hand joint mechanism driven by antagonistic drive with tendon transmission based on a dexterous hand control system with multiple sensors and antagonistic drive in this application.

As shown in FIGS. 1 and 2, the sensor module 18 comprises a joint angle sensor set 9 composed of multiple joint angle sensors 19, a tactile sensor set 10 composed of multiple tactile sensors 1 in bionic skin 7, a joint force and torque sensor set 11 composed of multiple joint force and torque sensors 3, and a tendon tension sensor set 12 composed of multiple tendon tension sensors 5.

As shown in FIG. 2, in a dexterous hand joint mechanism driven by tendon and antagonistic drive, the extension actuator assembly 8 (consisting of a rotational actuator output shaft connected to a capstan) and the flexion actuator assembly 6 (consisting of a rotational actuator output shaft connected to a capstan) can pull finger joint 4 through the dorsal side part of the tendon and the palm side part of the tendon respectively to form an antagonistic drive:

1) when the extension actuator assembly 8 pulls the dorsal side part of the tendon while the flexion actuator assembly 6 releases the palm side part of the tendon, the finger joint 4 rotates toward the dorsal side part of the hand so as to stretch; and 2) when the extension actuator assembly 8 releases the dorsal side part of the tendon while the flexion actuator assembly 6 pulls the palm side part of the tendon, the finger joint 4 rotates toward the dorsal side part of the hand so as to buckle.

As shown in FIGS. 1 and 2, the joint angle sensors 19 are arranged at each joint of the dexterous hand, and are configured to measure rotation angle of each joint, the output signal of the joint angle sensors is configured to be processed by the sensor management module 13 to obtain joint position information. The joint angle sensors 19 may be potentiometer sensors or Hall sensors or optical encoders.

The tactile sensors 1 are distributed in the bionic skin 7, and are configured to sense contact with an object, the output signal of the tactile sensors is configured to be processed by the sensor management module 13 to obtain tactile information.

Figure 3:
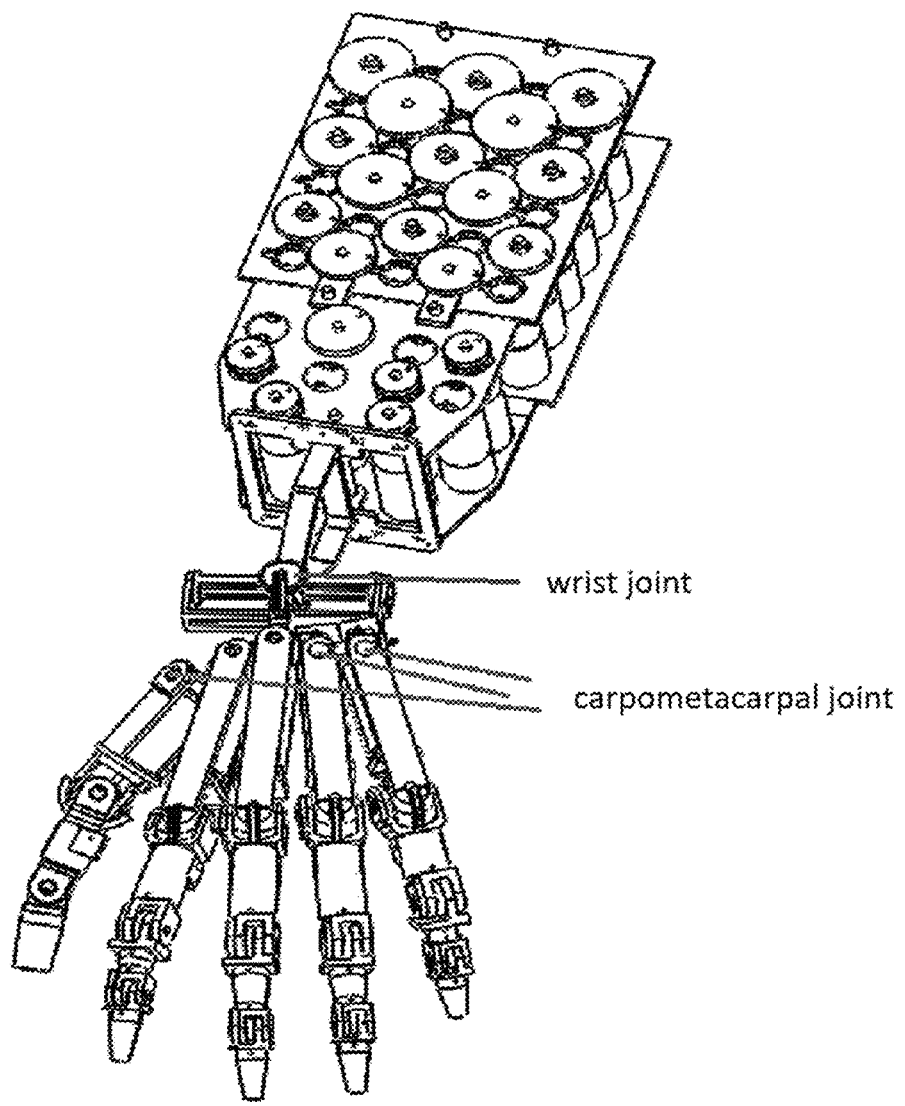
FIG. 3 is a schematic diagram of the wrist joint and carpometacarpal joint of a dexterous hand in this application.

The joint force and torque sensors 3 are arranged at each interphalangeal joint, metacarpophalangeal joint, carpometacarpal joint, and wrist joint of the dexterous hand, and are configured to measure one to multi-dimensional force or torque at the joint. The output signal of the joint force and torque sensors is configured to be processed by the sensor management module 13 to obtain joint force and torque information. For example, at the finger joint, the joint force and torque sensors 3 are preferred to be arranged at the junction of the finger joint 4 and finger joint 2 to effectively measure one to multi-dimensional force or torque at the finger joint 4. FIG. 3 is a schematic diagram of the wrist joint and carpometacarpal joint of a dexterous hand in this application. Said carpometacarpal joint refers to the joint mechanism between the palmar phalange of each finger in the dexterous hand and the root of the dexterous hand. Carpometacarpal joint may include multiple joints, such as the carpometacarpal joint of the ring finger, the carpometacarpal joint of the little finger and the carpometacarpal joint of the thumb. The wrist joint is the connecting mechanism between the base of the palm and the forearm of the dexterous hand.

The tendon tension sensors 5 are arranged within the tendon, and are configured to measure tension of the tendon, and the output signal of the tendon tension sensors are configured to be processed by the sensor management module 13 to obtain tendon tension information.

The joint force and torque sensors 3 and tendon tension sensor 5 can adopt strain gauge to act as sensitive elements.

As shown in FIGS. 1 and 2, the sensor management module 13 is configured to apply constant power or periodic scanning power to each joint angle sensor 19, each tactile sensor 1, each joint force and torque sensor 3, and each tendon tension sensor 5 in the sensor module, and the output signal of the sensors in the sensor module is configured to be amplified, filtered, sampled and converted by the sensor management module 13, and the sensor management module 13 is configured to monitor for missing sensors or abnormal conditions, and to pass processed output signals and monitoring results to the central control module 14.

When the joint angle sensor 19 adopts Hall sensors or optical encoders, the sensor management module 13 provides continuous power supply. When the joint angle sensor 19 uses potentiometers, the sensor management module 13 provides power for it in the way of periodic scanning to save power consumption and heat.

The sensor management module 13 is configured to receive control instructions from the central control module 14 and to adjust the working mode according to the control instructions.

The sensor management module 13 can use analog-to-digital conversion devices, control devices (such as single chip, ARM, DSP, CPLD, FPGA), communication protocol chip, power management chip and other components to constitute a circuit, and carry programs to achieve the above functions.

As shown in FIG. 1, the actuator control module 15 comprises a current loop, a voltage loop and a speed loop that control each actuator, and is configured to automatically protect voltage or current of the actuator from overload, and to monitor whether each actuator is missing or working abnormally, and to transmit the current, the voltage, speed and monitoring results to the central control module 14.

The actuator control module 15 is configured to receive the control instructions from the central control module 14 and to adjust control mode of each actuator according to the control instructions, that is, to select the current loop, the voltage loop, the speed loop or any combination of the current loop, the voltage loop and the speed loop to control each actuator.

The actuator control module 15 is configured to read joint angle information through the sensor management module 13 to form a joint limit direct control loop.

The actuator control module 15 is configured to read joint force and torque information through the sensor management module 13 to form a joint force and torque protection direct control loop.

The actuator control module 15 is configured to read the tendon tension information through the sensor management module 13 to form a tendon tension protection direct control loop.

The sensor management module 15 can use analog-to-digital conversion devices, control devices (such as single chip, ARM, DSP, CPLD, FPGA), communication protocol chip, power management chip and other components to constitute a circuit, and carry programs to achieve the above functions.

As shown in FIG. 1, the central control module 14 is configured to receive operation targets, and to control the sensor management module 13 and read each sensor's information, to obtain control signal through multi-sensor information synthesis and control strategy calculation process, and to transmit the control signal to the actuator control module 15 to control each actuator so as to further control joint position, joint speed, joint force and torque, joint damping, joint stiffness, tendon tension and the contact with the object of the dexterous hand.

The central control module 14 is able to employ a digital computer or an analog computer or FPGA or ASIC or a brain-inspired neural network chip or combination thereof as computation platform.

The central control module 14 is configured for hybrid computation using a deep learning neural network, a pulsed neural network and rule-based program.

The central control module 14 is equipped with a sensor sampling and analyzing strategy, a control strategy to prevent tendon relaxation, a control strategy to prevent tendon over-tightness, a controllable load-based control strategy, a dynamic model-based control strategy, and a neural network-based control strategy.

The central control module 14 is configured to assign for a specific joint, by configuration, the controllable load-based control strategy or the dynamic model-based control strategy or the neural network-based control strategy.

When the dexterous hand is not equipped with the joint force and torque sensors 3 or the tendon tension sensors 5, the central control module 14 is configured to adopt the dynamic model-based control strategy or the controllable load-based control strategy by default.

When the dexterous hand is installed with the joint force and torque sensors 3 and the tendon tension sensors 5, the central control module 14 is configured to adopt the neural network-based control strategy by default, and when the joint force and torque sensors 3 or the tendon tension sensor 5 are partially or completely missing or working abnormally, the central control module 14 is configured to automatically switch to the dynamic model-based control strategy or the controllable load-based control strategy to ensure system reliability.

The moment of inertia of a single finger joint in a dexterous hand is small, and the moment of inertia is less affected by the motion of other joints, so the driven actuators can be simplified with fixed inertia and controllable damping. When the driven actuator pulls the tendon with greater force, its equivalent damping is also larger, and vice versa. Therefore, when the joint force and torque sensors 3 or tendon tension sensor 5 are partially or completely missing or work abnormally, the controllable load-based control strategy is preferred by the central control module 14.

The moment of inertia of the integral hand of the dexterous hand is large, the moment of inertia with the attitude changes in acute, thus more complex models are needed for calculating. Therefore, when the wrist joint in the joint force and torque sensors 3 or 5 are partially or completely missing or work abnormally, the central control module 14 preferably adopts the dynamic model-based control strategy to control.

Figure 4:
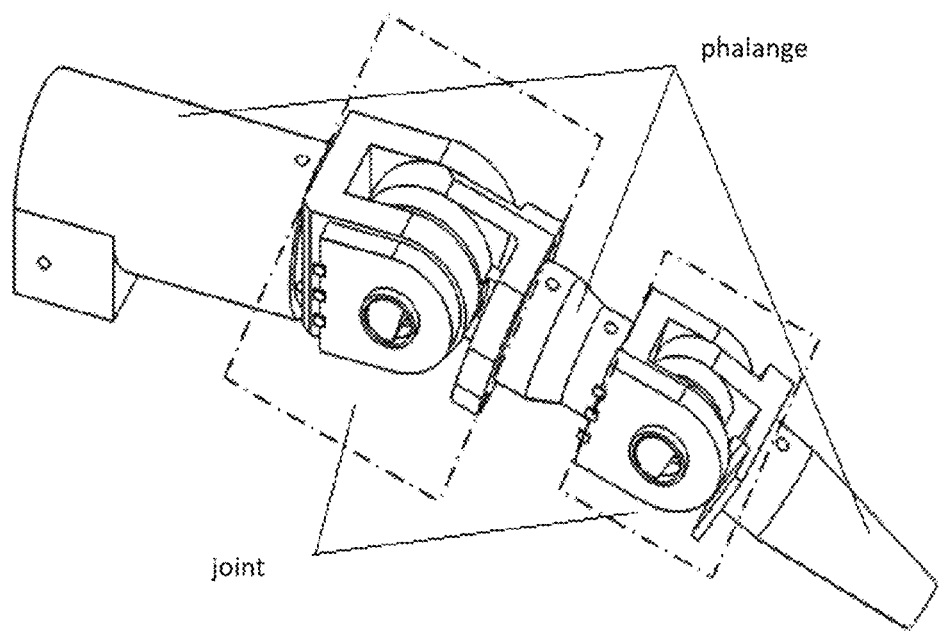
FIG. 4 is a schematic diagram of the index finger unit of a dexterous hand in this application.

The sensor sampling and analyzing strategy includes one or more of:
1) when there is a need to sense the contact with the object or to sense the shape and texture of the object without the need for accurate measurement of contact force, preferentially sampling the tactile sensors 1 in the bionic skin 7; increasing sampling frequency of the tactile sensors; and amplifying the weight of the tactile information relative to the sensor information during the calculation process of the multi-sensor information synthesis and control strategy;
2) when there is a need for fine manipulation and when interaction force and torque of hand phalanges and joints when in contact with the objects need to be accurately sensed, prioritizing the sampling of the joint force and torque sensors 3; increasing the sampling frequency of the joint force and torque sensors; amplifying the weight of the joint force and torque information relative to other sensory information during the calculation process of the multi-sensor information synthesis and control strategy; and at the same time, further perceiving the contact between the hand and the object, as well as the shape and texture of the object is achievable by combining the tactile information obtained by tactile sensor 1 in the bionic skin 7. FIG. 4 shows a schematic diagram of the index finger unit of a dexterous hand in this application. In the common concept of manipulators, "phalange" refers to the bar parts, and "joint" refers to two or more bar parts hinged through the motion pair (generally rotational pair) to form the connection part.

3) when pulling, lifting heavy objects or doing other actions that require a pre-set force (that is, a larger force range, such as finger force, needs to output at least 50N), prioritizing the sampling of the tendon tension sensors; increasing the sampling frequency of the tendon tension sensors to the force exerted by each finger or the whole hand on the object; amplifying the weight of the tendon tension information relative to other sensory information during the calculation process of the multi-sensor information synthesis and control strategy; and at the same time, further accurate measurement of the joint force or torque is achievable by combining the joint force and torque sensors-related information obtained by the joint force and torque sensors 3.

4) when some or all of the tactile sensors 1 of the bionic skin 7 are missing or malfunctioning, prioritizing the sampling of the joint force and torque sensors 3; and amplifying the weight of the joint force and torque information relative to the other sensory information during the calculation process of the multi-sensor information synthesis and control strategy calculation process; and 5) when some or all of the joint force and torque sensors 3 of the bionic skin 7 are missing or malfunctioning, prioritizing the sampling of the tendon tension sensors; and amplifying the weight of the tendon tension information relative to the other sensory information during the calculation process of the multi-sensor information synthesis and control strategy.

The sensor management module 13 is configured to automatically adjust the frequency of power applied to each sensor and the sampling frequency of the output signal of said each sensor based on an adjustment method. The adjustment method comprises:

1) when output signal amplitude of a certain sensor is continuously lower than a sensitivity threshold (for example the sensitivity threshold of the joint force and torque sensors 3 is set to 0.2 N) within a certain time range (for example 10 seconds), or change rate of the output signal amplitude with time is continuously lower than a change rate threshold (for example the sensitivity threshold of the joint force and torque sensors 3 is set to plus or minus 0.1 N/s) within a certain time range (for example 10 seconds), adjusting the frequency of power applied to the sensor and the sampling frequency of the output signal to a first pre-set frequency range, for example from 0.1 Hz to 10 Hz; and 2) when the amplitude of the output signal of any one of the sensors is higher than the sensitivity threshold, or the change rate of the output signal amplitude with time is higher than the change rate threshold, adjusting the frequency of power applied to the sensor and the sampling frequency of the output signal to a second pre-set frequency range, for example from 10 Hz to 1000 Hz.

When the sensor management module 13 receives the control instructions from the central control module 14, the sensor management module's working mode comprises one or more of:

1) applying power to the sensor specified by the control instructions at a specified frequency;
2) monitoring the sensor specified by the control instructions;
3) amplifying the output signal of the specified sensor by the multiplication factor specified by the control instructions;
4) filtering the output signal of the specified sensor by a filtering method specified by the control instructions;
5) prioritizing the sampling and converting the output signal of the sensor specified by the control instructions; and
6) sampling and converting the output signal of the specified sensor with the sampling frequency specified by the control instruction.

As shown in FIG. 1, when the system is abnormal so that the joint exceeds an allowable range of motion, the joint limit direct control loop is configured to respond quickly and to control the actuators to limit the joint to the allowable range of motion. The central control module 14 has a control instruction that intervenes the joint limit direct control loop, and is configured to actively prevent the joint limit direct control loop from working.

As shown in FIG. 1, when the system is abnormal so that the joint force and torque exceeds an allowable range of motion, the joint force and torque protection direct control loop is configured to respond quickly and to control the actuators to limit the joint force and torque to the allowable range of motion. The central control module 14 has a control instruction that intervenes the joint force and torque protection direct control loop, and is configured to actively prevent the joint force and torque protection direct control loop from working.

As shown in FIG. 1, when the system is abnormal so that the tendon tension exceeds an allowable range of motion, the tendon tension protection direct control loop is configured to respond quickly and to control the actuators to limit the tendon tension to the allowable range of motion. The central control module 14 has a control instruction that prohibits the tendon tension protection direct control loop, and is configured to actively prevent the tendon tension protection direct control loop from working.

The joint limit direct control loop, joint force and torque protection direct control loop and tendon tension protection direct control loop make the control system more reliable.

The control strategy for preventing the tendon relaxation comprises:

1) setting the minimum threshold of the tendon tension;
2) determining if the tendon tension is below the minimum threshold through the tendon tension sensor 5; and
3) if the tendon tension is below the minimum threshold, allowing the actuators that are pulling the tendon to further tighten the tendon until the tendon tension is equal to or slightly above the minimum threshold, and The control strategy to prevent tendon over-tightness comprises:

1) setting the highest threshold of tendon tension;
2) determining if the tendon tension is higher than the highest threshold by the tendon tension sensor 5;
3) if the tendon tension is above the maximum threshold, allowing the actuators that are pulling the tendon to further release the tendon until the tendon tension is equal to or slightly below the maximum threshold.

It should be noted that there may be some errors in the shape of the joints, phalanges and transmission parts in the dexterous hands, as well as the coordination and installation between them, so there may be some errors in the motion posture of the dexterous hands. For this reason, technicians in the field often make the dexterous hands work within a certain margin of error. The above "slightly above" refers to a small range in which tendon tension is above the minimum threshold, such as a first range (0.5 to 1N); "Slightly below" refers to a smaller range of tendon tension below the maximum threshold, such as a second range (0.5 to 1N). In fact, both ranges are flexible and can be larger or smaller. In other words, the above "slightly higher" and "slightly lower" are a state value proposed based on the inevitable and overcoming errors in the motion posture of the dexterous hand.

The controllable load-based control strategy comprises:
1) classifying the actuators that each constitutes an antagonistic drive to the controlled joint into active actuators and driven actuators;
2) adjusting the voltage or current of the driven actuator to make the driven actuator to be in the follow motion mode and to be dragged by the joint through the tendon so as to be equivalent to the controllable load with inertia and controllable damping;
3) according to the joint speed and the amount of damping required by the controllable load, calculating the voltage or current that the driven actuator should apply by the model of the actuator;
4) taking the motion process of the active actuators dragging the joint through the tendon so as to drag the controllable load as controlled object. The controlled object is equivalent to the joint motion control process of the robot driven by a single actuator, so the control problem is effectively simplified; and
5) using a first set, which consists of the joint position, the joint speed, the joint force and torque, the joint damping, the joint stiffness, the tendon tension, and the contact with the object, or the first set's subset as the expected values, and using a second, which consists of the joint position information, the joint speed information, the joint force and torque information, the tendon tension information, and the tactile information, or the second set's subset as feedback values, forming the open-loop or closed-loop control.

Figure 5:
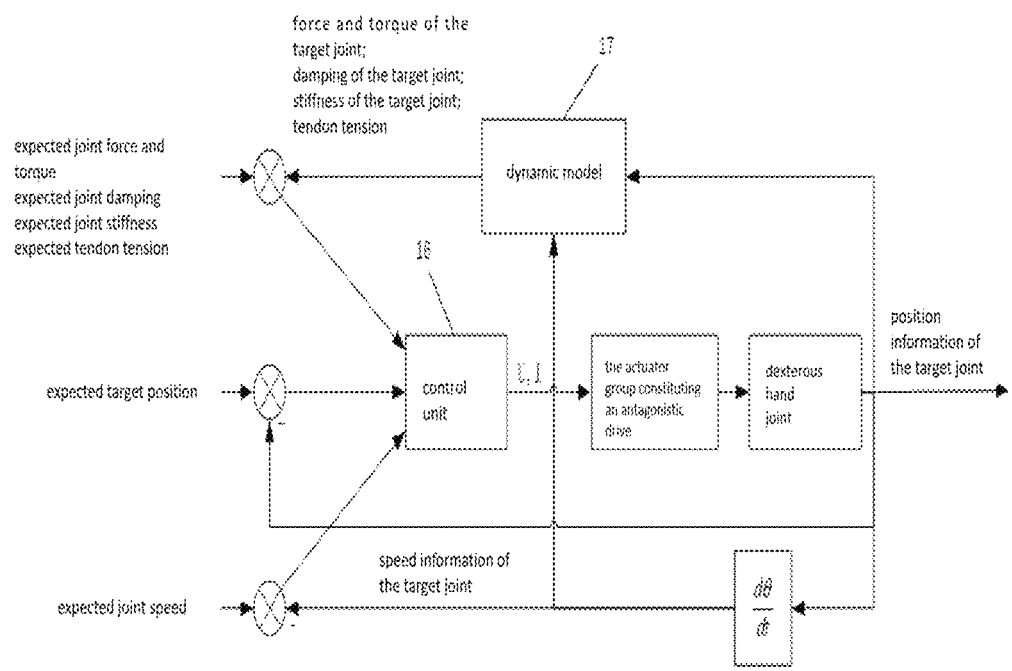
FIG. 5 is a block diagram of a dynamic model-based control strategy for a dexterous hand control system based on multiple sensors and antagonistic drive in this application.

As shown in FIG. 5, the dynamic model-based control strategy comprises:
1) establishing dynamic models 17 of the one or more actuators that each constitutes the antagonistic drive, the transmission, the joints and/or the external load. The dynamic models 17 comprise a functional relationship among time, the voltage or current of each actuator that constitutes the antagonistic drive, the joint position, the joint speed, the joint force and torque, the joint damping, the joint stiffness, and the tendon transmission. In the absence of the joint force and torque sensors 3 or the tendon tension sensors 5, the joint force and torque, the joint damping, the joint stiffness, and the tendon tension can be estimated through the dynamic models;
2) when an open-loop control is performed on a first set consisting of the joint force and torque, the joint damping, the joint stiffness, the tendon tension, or on a subset thereof as expected values, using the expected values and the joint position information as dependent variables of the dynamic models 17 to obtain the voltage or current that should be applied to each actuator that constitutes the antagonistic drive (or voltage or current as a function of time);
3) when the closed-loop control is performed on a second set consisting of the joint force and torque, the joint damping, the joint stiffness, the tendon tension, or on a subset thereof as the expected values, taking the joint position information and respective voltage or current of each actuator that constitutes the antagonistic drive as the input of the dynamic models 17; taking the output of the dynamic models 17 as estimated values of the joint force and torque, the joint damping, the joint stiffness, the tendon tension; using the estimated value corresponding to the expected values as the feedback values; making the difference between the feedback values and the expected values to get the deviation values; and inputting the deviation values to a control unit 16;
4) when the closed-loop control is performed on the target joint position and the target joint speed as the expected values, using the joint position information and the joint speed information as the feedback values; using the difference between the feedback values and the expected values to obtain the deviation values; and inputting the deviation values to the control unit 16; and
5) further calculating through the control unit 16 the voltage or current that should be applied to each actuator that constitutes the antagonistic drive.

In one possible implementation of this application embodiment, the control unit is configured with a PID control or a neural network-based control.

The neural network-based control strategy comprises:
1) building a multilayer neural network as a motion controller;
2) inputting a first set or a subset thereof consisting of the joint positions, the joint speeds, the joint forces and torques, the joint damping, the joint stiffness of one or more joints of the dexterous hand, the tendon tension, and the contact with the object as expected values to the multilayer neural network;
1) inputting a second set or a subset thereof consisting of the joint position information, the joint speed information, the joint force and torque information of one or more joints of the dexterous hand, the tendon tension information, and the tactile information to the multilayer neural network; and
2) taking output calculated by the multilayer neural network as the voltage or current that should be applied to each actuator.

The above are only optional embodiments of this application and are not intended to limit this application. This application is subject to various changes and variations for those skilled in the field. Any modification, equivalent replacement, improvement etc. made in the spirit and principle of this application shall be included in the scope of claims of this application.

What is claimed is:
1. A dexterous hand control system based on multi-sensor and antagonistic drive, comprising: a dexterous hand driven by an antagonistic tendon transmission; a sensor module; a sensor management module; an actuator control module; and a central control module, wherein the dexterous hand driven by an antagonistic tendon transmission is configured as a dexterous hand having one or more joints driven by tendon and antagonistic action, wherein the sensor module comprises a joint angle sensor set composed of multiple joint angle sensors, a tactile sensor set composed of multiple tactile sensors in bionic skin, a joint force and torque sensor set composed of multiple joint force and torque sensors, and a tendon tension sensor set composed of multiple tendon tension sensors, wherein the sensor management module is configured to apply constant power or periodic scanning power to each joint angle sensor, each tactile sensor, each joint force and torque sensor, and each tendon tension sensor in the sensor module, and an output signal of the sensors in the sensor module is configured to be amplified, filtered, sampled and converted by the sensor management module, and the sensor management module is configured to monitor for missing sensors or abnormal conditions, and to pass processed output signals and monitoring results to the central control module, wherein the sensor management module is configured to receive control instructions from the central control module and to adjust a working mode according to the control instructions, wherein the actuator control module comprises a current loop, a voltage loop and a speed loop that control each actuator, and is configured to automatically protect voltage or current of the actuator from overload, and to monitor whether each actuator is missing or working abnormally, and to transmit the current, the voltage, speed and monitoring results to the central control module, wherein the actuator control module is configured to receive the control instructions from the central control module and to adjust a control mode of each actuator according to the control instructions, that is, to separately select the current loop, the voltage loop, the speed loop or any combination of the current loop, the voltage loop and the speed loop to control each actuator, and wherein the central control module is configured to receive operation targets, and to control the sensor management module and read each sensor's information, to obtain control signal through multi-sensor information synthesis and control strategy calculation process, and to transmit the control signal to the actuator control module to control each actuator so as to further control joint position, joint speed, joint force and torque, joint damping, joint stiffness, tendon tension and contact with an object of the dexterous hand.

2. The dexterous hand control system according to claim 1, wherein the sensor management module is configured to automatically adjust a frequency of power applied to each sensor and a sampling frequency of the output signal of said each sensor based on an adjustment method, wherein the adjustment method comprises:

when an output signal amplitude of a certain sensor is continuously lower than a sensitivity threshold within a certain time range, or a change rate of the output signal amplitude with time is continuously lower than a change rate threshold within a certain time range, adjusting the frequency of power applied to the sensor and the sampling frequency of the output signal to a first pre-set frequency range; and when the amplitude of the output signal of any one of the sensors is higher than the sensitivity threshold, or the change rate of the output signal amplitude with time is higher than the change rate threshold, adjusting the frequency of power applied to the sensor and the sampling frequency of the output signal to a second pre-set frequency range.

3. The dexterous hand control system according to claim 1, wherein when the sensor management module receives the control instructions from the central control module, the working mode comprises one or more of:

applying power to a specified sensor specified by the control instructions at a specified frequency;

monitoring the specified sensor specified by the control instructions;

amplifying an output signal of the specified sensor by a multiplication factor specified by the control instructions;

filtering the output signal of the specified sensor by a filtering method specified by the control instructions;

prioritizing the sampling and converting the output signal of the specified sensor specified by the control instructions; and sampling and converting the output signal of the specified sensor with a sampling frequency specified by the control instruction.

4. The dexterous hand control system according to claim 1, wherein the central control module is provided with a controllable load-based control strategy, a dynamic model-based control strategy, and a neural network-based control strategy, wherein the controllable load-based control strategy comprises classifying actuators that each constitutes an antagonistic drive to a controlled joint into active actuators and driven actuators; and adjusting voltage and/or current of a driven actuator to make the driven actuator to be in follow motion mode and to be dragged by a joint through the tendon so as to be equivalent to a controllable load, forming open loop or closed loop control, wherein the dynamic model-based control strategy comprises establishing dynamic models of one or more actuators that each constitutes the antagonistic drive, gearing, joints and/or external loading; and estimating one or more state variables through the dynamic models, forming the open loop or closed loop control, and wherein the neural network-based control strategy comprises using a neural network as controller and inputting information of one or more sensors or the one or more state variables to the neural network; and taking the neural network's output as control input of the one or more actuators.

5. The dexterous hand control system according to claim 4, wherein the central control module is configured to assign for a specific joint, by configuration, the controllable load-based control strategy or the dynamic model-based control strategy or the neural network-based control strategy is adopted, wherein when the dexterous hand is not equipped with the joint force and torque sensors or the tendon tension sensors, the central control module is configured to adopt the dynamic model-based control strategy or the controllable load-based control strategy by default, and wherein when the dexterous hand is installed with the joint force and torque sensors and the tendon tension sensors, the central control module is configured to adopt the neural network-based control strategy by default, and wherein when the joint force and torque sensors or the tendon tension sensor are partially or completely missing or working abnormally, the central control module is configured to automatically switch to the dynamic model-based control strategy or the controllable load-based control strategy to ensure system reliability.

6. The dexterous hand control system according to claim 4, wherein the controllable load-based control strategy comprises:
classifying the one or more actuators that each constitutes an antagonistic drive to the controlled joint into active actuators and driven actuators;
adjusting the voltage or current of the driven actuator to make the driven actuator to be in the follow motion mode and to be dragged by the joint through the tendon so as to be equivalent to the controllable load with inertia and controllable damping;
according to a joint speed and an amount of damping required by the controllable load, calculating a voltage or current that the driven actuator should apply by a model of the driven actuator;
taking a motion process of active actuators dragging the joint through the tendon so as to drag the controllable load as a controlled object; and
using a first set, which consists of a joint position, a joint speed, a joint force and torque, joint damping, joint stiffness, tendon tension, and contact with the object, or a subset of the first set as expected values, and using a second set, which consists of joint position information, joint speed information, the joint force and torque information, tendon tension information, and tactile information, or a subset of the second set as feedback values, forming an open-loop or closed-loop control.

7. The dexterous hand control system according to claim 4, wherein the dynamic model-based control strategy comprises:
establishing dynamic models of the one or more actuators that each constitutes the antagonistic drive, the transmission, the joints and/or the external loading, wherein the dynamic models comprises a functional relationship among time, voltage or current of each actuator that constitutes the antagonistic drive, joint position, joint speed, joint force and torque, joint damping, joint stiffness, and tendon tension, wherein in the absence of the joint force and torque sensors or the tendon tension sensors, the joint force and torque, the joint damping, the joint stiffness, and the tendon tension can be estimated through the dynamic models;
when an open-loop control is performed on a first set consisting of the joint force and torque, the joint damping, the joint stiffness, the tendon tension, or on a subset thereof as expected values, using the expected values and joint position information as dependent variables of the dynamic models to obtain the voltage or current that should be applied to each actuator that constitutes the antagonistic drive;
when closed-loop control is performed on a second set consisting of the joint force and torque, the joint damping, the joint stiffness, the tendon tension, or on a subset thereof as the expected values, taking the joint position information and respective voltage or current of each actuator that constitutes the antagonistic drive as the input of the dynamic models; taking the output of the dynamic models as estimated values of the joint force and torque, the joint damping, the joint stiffness, the tendon tension; using the estimated values corresponding to the expected values as feedback values; making a difference between the feedback values and the expected values to get deviation values; and inputting the deviation values to a control unit;
when the closed-loop control is performed on an expected joint position and a target joint speed as the expected values, using the joint position information and joint speed information as the feedback values; using the difference between the feedback values and the expected values to obtain the deviation values; and inputting the deviation values to the control unit; and
further calculating through control unit the voltage or current that should be applied to each actuator that constitutes the antagonistic drive.

8. The dexterous hand control system according to claim 4, wherein the neural network-based control strategy comprises:
building a multilayer neural network as a motion controller;
inputting a first set or a subset thereof consisting of joint positions, joint speeds, joint forces and torques, joint damping, joint stiffness of the one or more joints of the dexterous hand, the tendon tension, and the contact with the object of one or more joints of the dexterous hand as expected values to the multilayer neural network;
inputting a second set or a subset thereof consisting of joint position information, joint speed information, joint force and torque information of one or more joints of the dexterous hand, tendon tension information, and tactile information to the multilayer neural network; and
taking output calculated by the multilayer neural network as a voltage or current that should be applied to each actuator.

9. The dexterous hand control system according to claim 1, wherein the central control module is provided with a sensor sampling and analyzing strategy, wherein the sensor sampling and analyzing strategy comprises one or more of:
when there is a need to sense contact with the object or to sense a shape and texture of the object without a need for accurate measurement of contact force, preferentially sampling the tactile sensors in the bionic skin; increasing a sampling frequency of the tactile sensors; and amplifying a weight of a tactile information relative to sensor information during a calculation process of multi-sensor information synthesis and control strategy;
when there is a need for fine manipulation and when interaction force and torque of hand phalanges and joints when in contact with objects need to be accurately sensed, prioritizing a sampling of a joint force and torque sensors; increasing a sampling frequency of the joint force and torque sensors; amplifying a weight of the joint force and torque information relative to other sensory information during the calculation process of multi-sensor information synthesis and control strategy; and at the same time, further perceiving contact between the dexterous hand and the object, as well as a shape and texture of the object is achievable by combining tactile information in the bionic skin;
when pulling, lifting heavy objects or doing other actions that require a pre-set force, prioritizing sampling of the tendon tension sensors; increasing a sampling frequency of the tendon tension sensors to a force exerted by each finger or the dexterous hand as a whole on the object; amplifying a weight of tendon tension information relative to other sensory information during the calculation process of the multi-sensor information synthesis and control strategy; and at the same time, further accurate measurement of the joint force or torque is achievable by combining the joint force and torque sensors-related information;

when some or all of the tactile sensors of the bionic skin are missing or malfunctioning, prioritizing a sampling of the joint force and torque sensors; and amplifying a weight of the joint force and torque information relative to other sensory information during the calculation process of the multi-sensor information synthesis and control strategy; and when some or all of the joint force and torque sensors of the bionic skin are missing or malfunctioning, prioritizing a sampling of the tendon tension sensors; and amplifying a weight of the tendon tension information relative to other sensor information during the calculation process of the multi-sensor information synthesis and control strategy.

10. The dexterous hand control system according to claim 1, wherein the joint angle sensors are arranged at each joint of the dexterous hand, and are configured to measure rotation angle of each joint, the output signal of the joint angle sensors is configured to be processed by the sensor management module to obtain joint position information, wherein the tactile sensors are distributed in the bionic skin, and are configured to sense contact with the object, the output signal of the tactile sensors is configured to be processed by the sensor management module to obtain tactile information, wherein the joint force and torque sensors are arranged at each interphalangeal joint, metacarpophalangeal joint, carpometacarpal joint, and wrist joint of the dexterous hand, and are configured to measure one to multi-dimensional force or torque at the joint, and the output signal of the joint force and torque sensors is configured to be processed by the sensor management module to obtain joint force and torque information, and wherein the tendon tension sensors are arranged within tendon, and are configured to measure tension of the tendon, and the output signal of the tendon tension sensors are configured to be processed by the sensor management module to obtain tendon tension information.

11. The dexterous hand control system according to claim 1, wherein the actuator control module is configured to read joint angle information through the sensor management module to form a joint limit direct control loop, wherein when the system is abnormal so that a joint exceeds an allowable range of motion, the joint limit direct control loop is configured to respond quickly and to control actuators to limit the joint to the allowable range of motion, wherein the central control module has a control instruction that intervenes the joint limit direct control loop, and is configured to actively prevent the joint limit direct control loop from working.

12. The dexterous hand control system according to claim 1, wherein the actuator control module is configured to read joint force and torque information through the sensor management module to form a joint force and torque protection direct control loop, wherein when the system is abnormal so that the joint force and torque exceeds an allowable range of motion, the joint force and torque protection direct control loop is configured to respond quickly and to control actuators to limit the joint force and torque to the allowable range of motion, wherein the central control module has a control instruction that intervenes the joint force and torque protection direct control loop, and is configured to actively prevent the joint force and torque protection direct control loop from working.

13. The dexterous hand control system according to claim 1, wherein the actuator control module is configured to read tendon tension information through the sensor management module to form a tendon tension protection direct control loop, wherein when the system is abnormal so that the tendon tension exceeds an allowable range of motion, the tendon tension protection direct control loop is configured to respond quickly and to control actuators to limit the tendon tension to the allowable range of motion, wherein the central control module has a control instruction that prohibits the tendon tension protection direct control loop, and is configured to actively prevent the tendon tension protection direct control loop from working.

14. The dexterous hand control system according to claim 1, wherein the central control module is provided with a control strategy to prevent tendon relaxation, wherein the control strategy for preventing the tendon relaxation comprises:

setting a minimum threshold of the tendon tension;
determining if the tendon tension is below the minimum threshold through the tendon tension sensor; and
if the tendon tension is below the minimum threshold, allowing actuators that are pulling the tendon to further tighten the tendon until the tendon tension is equal to or slightly above the minimum threshold, and wherein the control strategy to prevent tendon over-tightness comprises:

setting a highest threshold of tendon tension;
determining if the tendon tension is higher than the highest threshold by the tendon tension sensor;
if the tendon tension is above the highest threshold, allowing the actuators that are pulling the tendon to further release the tendon until the tendon tension is equal to or slightly below the highest threshold.

* * * * *